Patented June 1, 1937

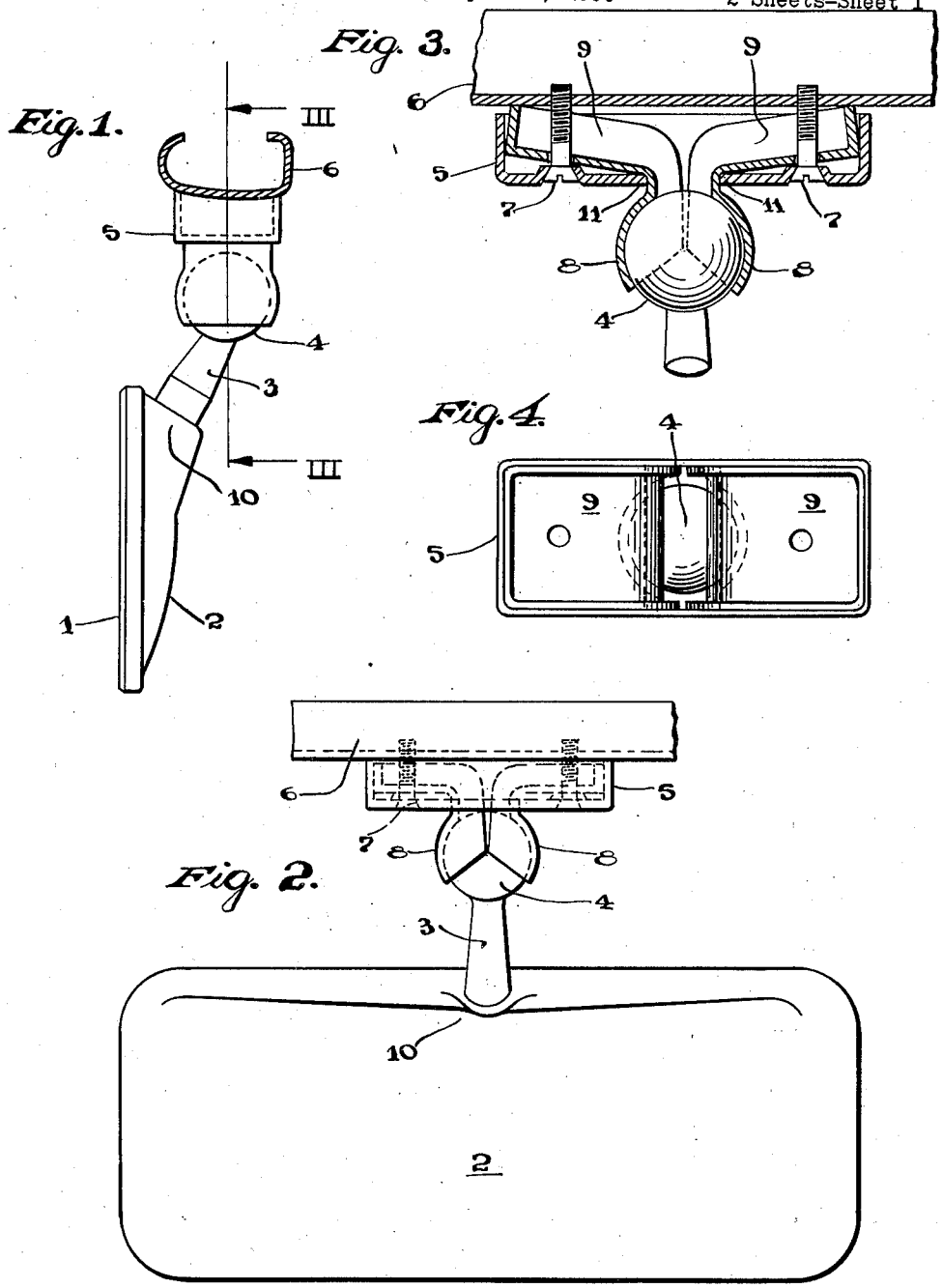

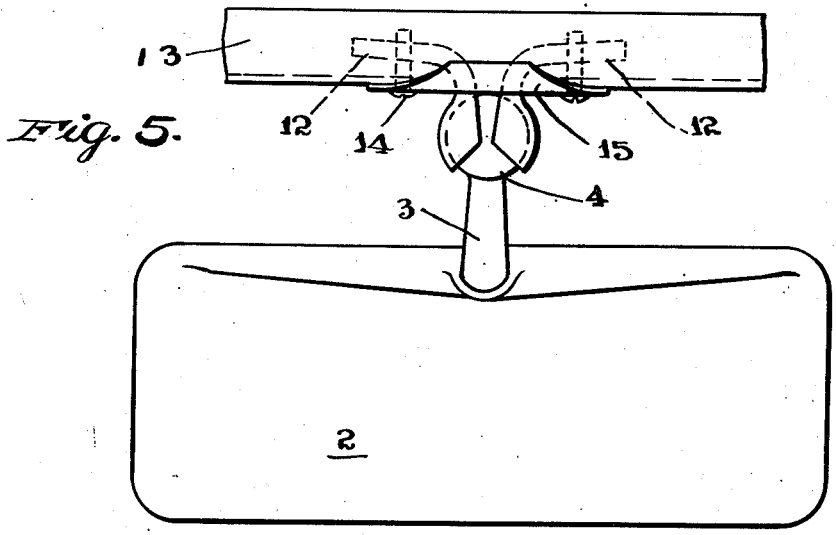
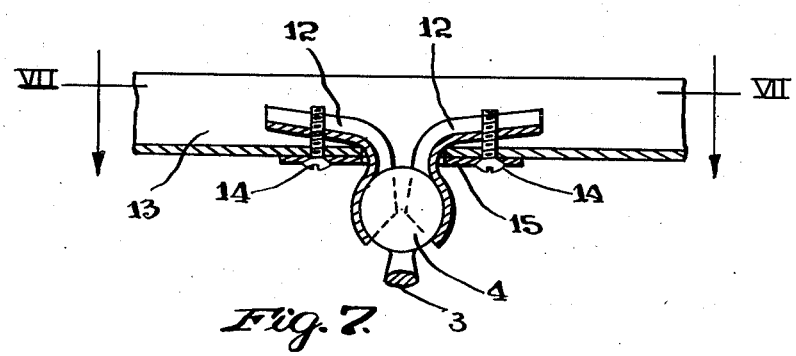
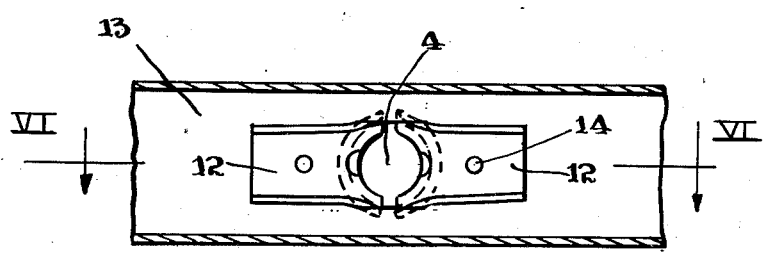

2,082,597

UNITED STATES PATENT OFFICE 2,082,597

REAR VIEW MIRROR SUPPORT

Lucien G. Ponce, Follansbee, W. Va., assignor to Liberty Mirror Works, a corporation of Pennsylvania Application April 8, 1936, Serial No. 73,260

3 Claims. (Cl. 248—288)

The invention relates to a support for a rear view automobile mirror, and has for its objects the provision of a device of cheap, simple construction having improved means operable by the securing of the supporting casing of the device to the automobile molding for operating the ball clamping socket. One embodiment of the invention is shown in the accompanying drawings, wherein:

Figure 1 is a side elevation. Fig. 2 is a rear elevation. Fig. 3 is a section on an enlarged scale on the line III—III of Fig. 1, with the parts in the position occupied before the securing screws are tightened to bring the edges of the supporting casing against the garnish molding. Fig. 4 is a plan view. And Figs. 5, 6, and 7 illustrate a modification in which Fig. 5 is a rear elevation, Fig. 6 a section on the line VI—VI of Fig. 7, and Fig. 7 a plan view.

Referring to the drawings, 1 is the mirror plate; 2 is a metal backing member which carries the plate and which may be in the form shown or merely a clamp; 3 is a post carrying at its upper end the ball 4; 5 is a casing member which is attached to the garnish molding 6 of the automobile by means of the screws 7; 8, 8 are the lower ends of a pair of lever arms of spring material formed into a socket and projecting through the bottom of the casing, and 9, 9 are the upper ends of the lever arms located inside the casing.

The backing member 2 is provided at its upper portion with a shoulder 10, to which the lower end of the post 3 is secured, preferably by riveting to a reinforcing strip lying inside the member 2.

The parts occupy the position shown in Fig. 3 before the screws 7 are tightened to draw the casing against the garnish molding 6. At this time, the ends of the arms 9, 9 project above the upper edge of the casing, so that when the screws are tightened, the arms are forced downward around the points 11, 11, at which they are fulcrumed in the casing, and the ball is clamped between the socket ends 8, 8 of the lever arms. The act of clamping the casing 5 in position, therefore, gives the proper degree of yielding pressure on the ball 4 so that the mirror will remain in any position of adjustment in which it is placed.

Figs. 5, 6, and 7 illustrate a modification, in which the socketed clamping arms 12, 12 lie with their upper ends above the bottom of the garnish molding 13, such ends being moved up and down by the screws 14, 14 which are threaded through the arms. A reinforcing plate 15 is provided beneath the molding in which the heads of the screws are countersunk. The socketed ends of the arms grip the ball 4 of the post 3 which carries the mirror as in the construction of Figs. 1 to 4.

What I claim is:

1. In combination in a rear view mirror support, a post adapted at its lower end to be secured to the backing of a mirror plate and having a ball at its upper end, a support above the post, a housing having its upper side open located on the lower side of the support, a pair of bell crank lever arms fulcrumed in the casing and having their lower ends which are in opposition shaped to socket form engaging said ball and having their upper ends extended above the upper edge of the housing, and screw means for drawing the housing toward the support so that the upper ends of the lever arms engage such support and are swung downward thereby as the casing is drawn into engagement with the support, thus causing the lower ends of the arms to clamp the ball.

2. In combination in a rear view mirror support, a post adapted at its lower end to be secured to the backing of a mirror plate and having a ball at its upper end, a support above the post, a pair of bell crank lever arms extending through and fulcrumed in the support and having their lower ends which are shaped to socket form engaging said ball and having their upper ends extended laterally above the support, and screw members extending through the support and threaded into the laterally extending ends of said arms.

3. In combination in a rear view mirror support, a post adapted at one end to be secured to the backing of a mirror plate and having a ball at its other end, a pair of bell crank levers having two of their ends in opposition and shaped to socket form and engaging said ball and having their other ends extending laterally through an opening in a supporting member and with their central portions fulcrumed on the wall of said opening, and adjusting means acting upon the levers for causing them to swing about their points of support into clamping engagement with the ball.

LUCIEN G. PONCE.